(12) United States Patent
Mutsuno

(10) Patent No.: US 11,947,853 B2
(45) Date of Patent: Apr. 2, 2024

(54) PRINT SYSTEM, PRINTING APPARATUS, METHOD OF CONTROLLING THE PRINTING APPARATUS, AND STORAGE MEDIUM

(71) Applicant: CANON KABUSHIKI KAISHA, Tokyo (JP)

(72) Inventor: Masahiro Mutsuno, Tokyo (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 17/884,859

(22) Filed: Aug. 10, 2022

(65) Prior Publication Data

US 2023/0101468 A1 Mar. 30, 2023

(30) Foreign Application Priority Data

Sep. 24, 2021 (JP) ................................. 2021-156081

(51) Int. Cl.
*G06F 3/12* (2006.01)
*G06K 15/02* (2006.01)
*H04N 1/00* (2006.01)
*H04N 1/32* (2006.01)

(52) U.S. Cl.
CPC .......... *G06F 3/1265* (2013.01); *G06F 3/1208* (2013.01); *G06K 15/1836* (2013.01); *H04N 1/00005* (2013.01); *H04N 1/00045* (2013.01); *H04N 1/00058* (2013.01); *H04N 1/00633* (2013.01); *H04N 1/32529* (2013.01)

(58) Field of Classification Search
None
See application file for complete search history.

(56) References Cited

U.S. PATENT DOCUMENTS

| 10,686,947 | B2 | 6/2020 | Aizawa | |
|---|---|---|---|---|
| 2013/0187970 | A1* | 7/2013 | Inoue | B41J 2/12 347/14 |
| 2018/0157446 | A1* | 6/2018 | Fukuda | G06K 15/16 |
| 2020/0234421 | A1* | 7/2020 | Kaminaka | G06F 3/1204 |
| 2021/0067649 | A1* | 3/2021 | Okajima | H04N 1/00639 |

(Continued)

FOREIGN PATENT DOCUMENTS

| JP | 2013179511 | * | 9/2013 | ............... H04N 1/00 |
|---|---|---|---|---|
| JP | 2015052886 | * | 3/2015 | ............... G06T 1/00 |
| JP | 2015216417 | A | 12/2015 | |

(Continued)

*Primary Examiner* — Beniyam Menberu
(74) *Attorney, Agent, or Firm* — ROSSI, KIMMS & McDOWELL LLP

(57) ABSTRACT

A print system including a printing apparatus and an inspection apparatus, the printing apparatus obtains, from a print job, image data to be used for printing, registers in the inspection apparatus the image data as a reference image, in response to completion of registration of the reference image in the inspection apparatus, executes printing on a sheet based on the print job, and notifies the inspection apparatus of an instruction for inspecting the sheet on which printing has been performed. The inspection apparatus registers the image data received from the printing apparatus as the reference image, and in response to the instruction for inspecting, inspects the sheet on which the printing has been performed in the printing apparatus.

19 Claims, 8 Drawing Sheets

(56) References Cited

U.S. PATENT DOCUMENTS

2021/0096789 A1* 4/2021 Goda .................... G06F 3/1256

FOREIGN PATENT DOCUMENTS

| JP | 2016151534 | * | 8/2016 | ............... G06T 3/00 |
| JP | 2019095476 A | | 6/2019 | |
| JP | 2019132661 | * | 8/2019 | ............... G06T 1/00 |
| JP | 2021049744 | * | 4/2021 | ............... H04N 1/00 |

* cited by examiner

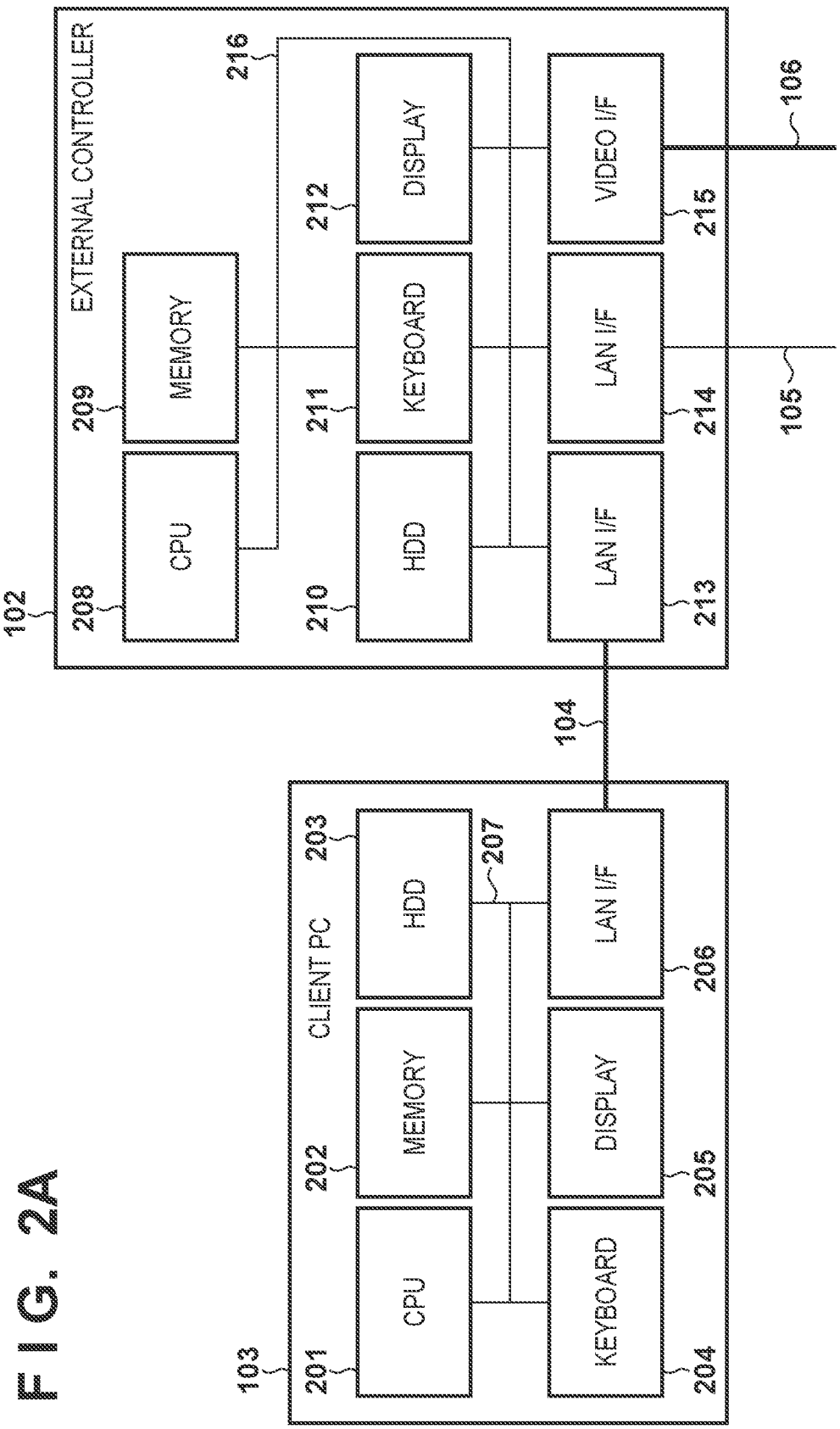

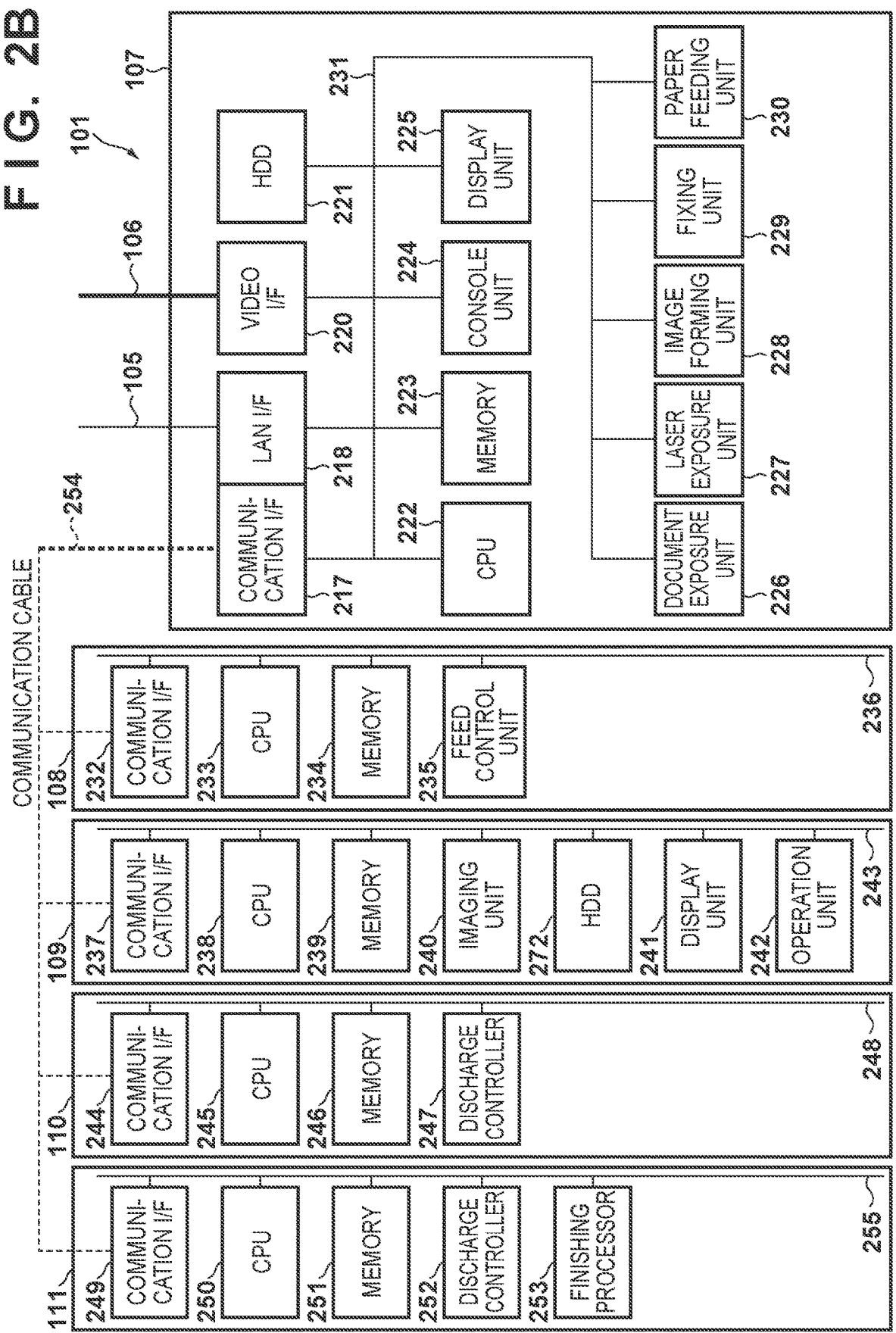

PRINT SYSTEM, PRINTING APPARATUS, METHOD OF CONTROLLING THE PRINTING APPARATUS, AND STORAGE MEDIUM

BACKGROUND OF THE INVENTION

Field of the Invention

The present invention relates to a print system, a printing apparatus, a method of controlling the printing apparatus, and a storage medium.

Description of the Related Art

In recent years, print systems capable of inspecting an image printed on a paper by a printing apparatus using an inspection apparatus during conveyance of the paper have been known. In such inspection of printed paper, an inspection apparatus reads an image on conveyed printed paper and registers the read image as a reference image. Then, the inspection apparatus determines whether or not an output product (printed paper) of an executed print job is normal by analyzing and comparing with the reference image an image of the output product. Inspection by the inspection apparatus makes it possible to detect, for example, a lack of image and a printing stain.

In an inspection system that includes such an inspection apparatus, it is necessary to print in advance a target image to be inspected on a paper, read the paper on which the target image has been printed using the inspection apparatus, and register the read image as a reference image in the inspection apparatus. However, in the inspection system configured as such, since the paper on which the target image has been printed is read in the registration of the reference image; it is necessary for an operator to visually confirm whether the paper on which the target image has been printed and the read image are appropriate for the registration of the reference image. At this time, if there are a lot of papers to be printed, an amount of confirmation work to be performed by the operator increases, resulting in confirmation needing a lot of time and a possibility of work mistakes. Japanese Patent Laid-Open No. 2019-95476 discloses, by comparing a reference image, which is raster data generated from print data, and image data obtained by printing an image to be inspected on a paper and reading the image on the paper, inspecting the image obtained by the reading.

However, when registering raster data generated from print data as a reference image as in the above conventional technique, there is a possibility that an image of a print job to be inspected may be printed before a corresponding reference image is registered in an inspection apparatus. In such a case, there is a possibility that a reference image may not be registered in time, resulting in an abnormal inspection result.

SUMMARY OF THE INVENTION

An aspect of the present invention is to eliminate the above-mentioned problem with conventional technology.

A feature of the present invention is to provide a technique of enabling prevention of an inspection failure caused by executing a print job and giving an inspection instruction before a corresponding reference image is registered in an inspection apparatus.

According to a first aspect of the present invention, there is provided a print system including a printing apparatus and an inspection apparatus, the printing apparatus comprising: a printer engine; and a first controller including one or more first processors and one or more first memories, the first controller being configured to: obtain, from a print job, image data to be used for printing; register in the inspection apparatus the image data as a reference image; in response to completion of registration of the reference image in the inspection apparatus, control the printer engine in accordance with the print job so as to cause the printer engine to execute printing on a sheet; and notify the inspection apparatus of an instruction for inspecting the sheet on which printing has been performed by the printer engine, the inspection apparatus comprising: a second controller including one or more second processors and one or more second memories, the second controller being configured to: register the image data received from the printing apparatus as the reference image; notify the printing apparatus of completion of registration of the reference image; and in response to the instruction for inspecting, inspect the sheet on which the printing has been performed in the printing apparatus.

According to a second aspect of the present invention, there is provided a printing apparatus comprising: a printer engine; and a controller including one or more processors and one or more memories, the controller being configured to: obtain, from a print job, image data to be used for printing; register in the inspection apparatus the image data as a reference image; in response to completion of registration of the reference image in the inspection apparatus, control the printer engine in accordance with the print job so as to cause the printer engine to execute printing on a sheet; and notify the inspection apparatus of an instruction for inspecting sheet on which printing has been performed by the printer engine.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 2A is a block diagram for describing a hardware configuration of an external controller and a client PC according to the embodiment.

FIG. 2B is a block diagram for describing a hardware configuration of an image forming apparatus according to the embodiment.

DESCRIPTION OF THE EMBODIMENTS

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. Further, in the accompanying drawings, identical or similar components are denoted by identical reference signs, and redundant description will be omitted. In the following descriptions, an external controller may be referred to as an information processing apparatus, an image processing controller, a digital front end (DFE), a print server, and the like. An image forming apparatus may be referred to as a multifunction device and a multifunction peripheral (MFP).

Figure 1:
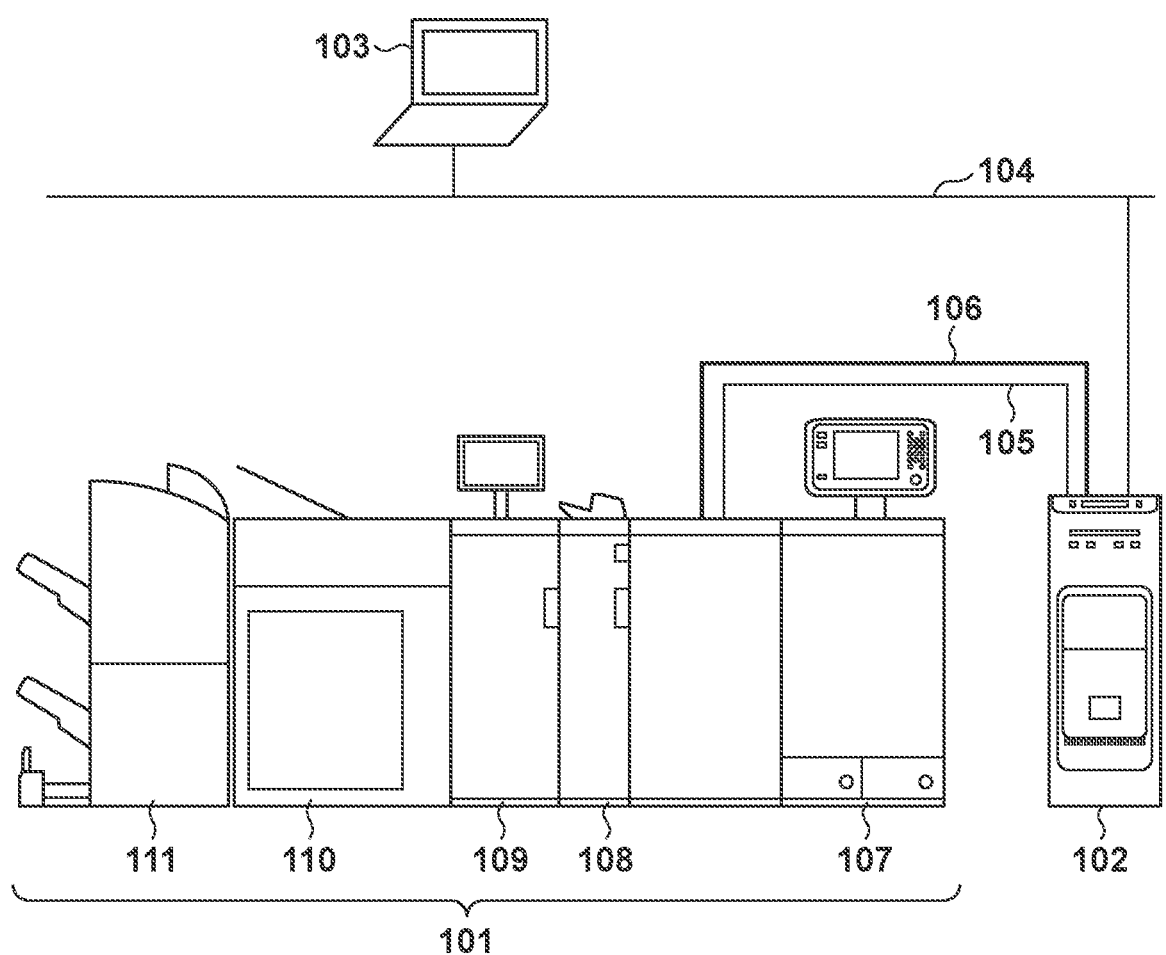
FIG. 1 is a diagram for describing an overall configuration of a print system according to an embodiment of the present invention.

FIG. 1 is a diagram for describing an overall configuration of a print system according to an embodiment of the present invention.

This print system includes an image forming apparatus 101 and an external controller 102. The image forming apparatus 101 and the external controller 102 are connected via an internal LAN 105 and a video cable 106 so as to be capable of communication with each other. The external controller 102 is also connected to a client PC 103 via an external LAN 104 so as to be capable of communication therewith, and the client PC 103 can give a print instruction to the external controller 102.

A printer driver including a function for converting print data into a print description language (such as a page description language (PDL)) that can be processed by the external controller 102 is installed on the client PC 103. A user of the client PC 103 can give a print instruction from various applications via the printer driver. At this time, the printer driver transmits print data to the external controller 102 based on the print instruction from the user. When the print instruction is received from the client PC 103, the external controller 102 analyzes the print data and performs rasterization (RIP) processing to create image data for printing. Then, the print data is transmitted to the image forming apparatus 101 via the internal LAN 105, and the rasterized image data is inputted to the image forming apparatus 101 by the video cable 106.

Next, the image forming apparatus 101 will be described.

In the image forming apparatus 101, apparatuses including a plurality of different functions are connected and configured so as to be capable of complicated print processing such as bookbinding. A printing apparatus 107 forms (prints) an image using toner on paper conveyed from a paper feeding unit at a lower portion of the printing apparatus 107. Here, a description will be given using paper as an example; however, print mediums, such as a sheet, film and the like, other than paper may also be used. A configuration and an operation principle of the printing apparatus 107 are as follows. A light beam, such as a laser beam, modulated according to image data is reflected by a rotating polygonal mirror, such as a polygon mirror, and is irradiated onto a photosensitive drum as a scanning beam. An electrostatic latent image formed on the photosensitive drum by the laser beam is developed using toner, and the toner image is transferred to paper attached to a transfer drum. A full color image is formed on paper by sequentially executing this series of image forming processes for yellow (Y), magenta (M), cyan (C), and black (K) toners. The paper on the transfer drum on which the full color image is thus formed is conveyed to a fixing unit. The fixing unit includes a roller, a belt, and the like; contains a heat source, such as a halogen heater, in the roller; and melts, using heat and pressure, toner on paper to which a toner image has been transferred, thereby fixing the toner to the paper.

An inserter 108 can insert paper at an arbitrary position into a group of papers on which printing has been performed by the printing apparatus 107 and conveyed.

An inspection apparatus 109 reads an image of conveyed paper (printed product) and compares it with reference image data (a reference image) registered in advance to determine whether an image printed on the printed product is normal or not. Printed products that have been determined to be normal or not are, for example, discharged sorted into normal printed products and error-occurring printed products.

A large-volume stacker 110 is capable of stacking and storing a large volume of paper. A finisher 111 performs finishing processing on conveyed papers. This finishing processing includes processing such as stapling, punching, and saddle-stitch bookbinding, and a paper bundle on which the finishing processing has been performed is discharged to a paper discharge tray.

Although the print system of FIG. 1 is configured by connecting the external controller 102 to the image forming apparatus 101, the present invention is not limited to a configuration in which the external controller 102 is connected. That is, a configuration may be taken so as to directly connect the image forming apparatus 101 to the external LAN 104 and directly transmit print data from the client PC 103 to the image forming apparatus 101. In this case, print processing is performed with data analysis and rasterization processing being performed in the image forming apparatus 101.

FIGS. 2A and 2B are block diagrams for describing hardware configurations of the image forming apparatus 101, the external controller 102, and the client PC 103 according to the embodiment.

Referring first to FIG. 2A, a configuration of the external controller 102 will be described.

The external controller 102 includes a CPU 208, a memory 209, a hard disk drive (HDD) 210, a keyboard 211, a display 212, a LAN interface (I/F) 213, a LAN I/F 214, and a video I/F 215, which are connected via a bus 216. The CPU 208 deploys in the memory 209 a program stored in the HDD 210, executes the deployed program to thereby perform processing, such as receiving print data from the client PC 103, processing for converting to bit map data (RIP processing), and transmitting print data to the image forming apparatus 101. The memory 209 includes a RAM, stores programs and data necessary for when the CPU 208 performs various kinds of processing, and operates as a work area. The HDD 210 stores programs and data necessary for operation, such as print processing. The keyboard 211 is a device for inputting operation instructions to the external controller 102. The display 212 displays information, such as an application executed by the external controller 102, using still images and a video signals of moving images. The LAN I/F 213 is connected with the client PC 103 via the external LAN 104 and performs communication for print instructions and the like. The LAN I/F 214 is connected with the image forming apparatus 101 via the internal LAN 105 and performs communication for print instructions and the like. The video I/F 215 is connected with the image forming apparatus 101 via the video cable 106 and performs communication for image data and the like.

Next, a configuration of the client PC 103 will be described. The client PC 103 includes a CPU 201, a memory 202, an HDD 203, a keyboard 204, a display 205, and a LAN I/F 206, which are connected via a bus 207. The CPU 201 deploys in the memory 202 a document processing program stored in the HDD 203, executes the deployed program, and executes print data creation and print instruction. The CPU 201 also comprehensively controls the respective devices connected to the bus 207. The memory 202 includes a ROM, a RAM, and the like; stores programs and data necessary for when the CPU 201 performs various kinds of processing; and operates as a work area of the CPU 201. The HDD 203 stores programs and data necessary for operations such as print processing. The keyboard 204 is a device for inputting operation instructions to the PC 103. The display 205 displays information, such as an application executed by the client PC 103, using still images and video signals of moving images. The LAN I/F 206 is connected to the external LAN 104 and performs communication for print instructions and the like.

Next, referring to FIG. 2B, a configuration of the printing apparatus 107, the inserter 108, the inspection apparatus 109, the large-volume stacker 110, and the finisher 111 of the image forming apparatus 101 according to the embodiment will be described.

The printing apparatus 107 of the image forming apparatus 101 includes a communication I/F 217, a LAN I/F 218, a video I/F 220, an HDD 221, a CPU 222, a memory 223, a console unit 224, and a display unit 225. The printing apparatus 107 further includes a document exposure unit 226, a laser exposure unit 227, an image forming unit 228, a fixing unit 229, and a paper feeding unit 230. These components are connected via a system bus 231.

The communication I/F 217 is connected to the inserter 108, the inspection apparatus 109, the large-volume stacker 110, and the finisher 111 via a communication cable 254 and performs communication for controlling the respective apparatuses. The LAN I/F 218 is connected with the external controller 102 via the internal LAN 105 and performs communication for print instructions and the like. The video I/F 220 is connected with the external controller 102 via the video cable 106 and performs communication for image data and the like.

The HDD 221 is a storage device in which programs and data are stored. The CPU 222 deploys in the memory 223 a program stored in the HDD 221, executes the deployed program, and comprehensively performs image processing control and printing control. The memory 223 includes a ROM and a RAM, stores programs and image data necessary for when the CPU 222 performs various kinds of processing; and operates as a work area of the CPU 222. The console unit 224 receives operation instructions and input for various settings from the user. The display unit 225 displays setting information, a print job processing status, and the like of the image forming apparatus 101.

The document exposure unit 226 performs processing for reading a document when a copy function or a scan function is used. That is, the document exposure unit 226 obtains document data by capturing an image using a CCD camera while illuminating an exposure lamp over paper set by the user. The laser exposure unit 227 performs primary charge for irradiating the photosensitive drum with a laser beam to transfer a toner image, and laser exposure. The laser exposure unit 227 first performs primary charging in which a surface of the photosensitive drum is charged to a uniform negative potential. Next, a laser beam is irradiated onto the photosensitive drum by a laser driver while an angle of reflection is adjusted using the polygon mirror. As a result, a negative charge of an irradiated portion is neutralized to form an electrostatic latent image. The image forming unit 228 is an apparatus for transferring toner to paper; includes a developing unit, a transfer unit, a toner replenishment unit, and the like; and transfers toner on the photosensitive drum to paper. The developing unit visualizes an electrostatic latent image on a surface of the photosensitive drum by adhering negatively-charged toner thereto from a developing cylinder. The transfer unit performs primary transfer in which a positive potential is applied to the primary transfer roller to transfer toner on a surface of the photosensitive drum to the transfer belt and secondary transfer in which a positive potential is applied to the transfer roller to transfer toner on the transfer belt to paper. The fixing unit 229 is a device for melting and fixing toner on paper to the paper using heat and pressure and includes a heater, a fixing belt, a pressure belt, and the like. The paper feeding unit 230 is a device for feeding paper, and a feed operation and a conveyance operation for paper are controlled by rollers and various sensors.

Next, a configuration of the inserter 108 of the image forming apparatus 101 will be described. The inserter 108 of the image forming apparatus 101 includes a communication I/F 232, a CPU 233, a memory 234, and a feed control unit 235, which are connected via a bus 236. The communication I/F 232 is connected to the printing apparatus 107 via the communication cable 254 and performs communication necessary for control. The CPU 233 executes a control program stored in the memory 234 to perform various controls necessary for paper feeding. The memory 234 is a storage device in which the control program is stored. Based on instructions from the CPU 233, the feed control unit 235 controls feeding and conveyance of paper conveyed from the printing apparatus 107 and a paper feeding unit of the inserter 108 while controlling rollers and sensors.

Next, a configuration of the inspection apparatus 109 of the image forming apparatus 101 will be described.

The inspection apparatus 109 includes a communication I/F 237, a CPU 238, a memory 239, an imaging unit 240, a display unit 241, an operation unit 242, and an HDD 272, which are connected via a bus 243. The communication I/F 237 is connected to the printing apparatus 107 via the communication cable 254 and performs communication necessary for control. Reference image data used for inspection is also received from the printing apparatus 107 via the communication cable 254 and the communication I/F 237 and stored in the HDD 272. The CPU 238 executes a control program stored in the memory 239 to perform various controls necessary for inspection. The memory 239 includes a ROM and a RAM and stores the control program and the like. It is preferable for the memory 239 to include a large-volume rewritable non-volatile memory for registering reference image data in a non-volatile manner.

Based on instructions of the CPU 238, the imaging unit 240 captures conveyed paper and reads an image printed on the paper. The CPU 238 compares image data obtained by image capturing by the imaging unit 240 and reference image data (reference image) stored in the memory 239 to determine whether a printed image is normal. The display unit 241 displays an inspection result, a setting screen, and the like. The operation unit 242 is operated by the user and receives instructions, such as a change in settings of the inspection apparatus 109 and registration of a reference image. The HDD 272 stores reference images. When the HDD 272 is not provided, a configuration may be taken so as to store reference images in the HDD 221 of the printing apparatus 107 and, when performing processing for determining whether or not a printed image is normal (good or bad), transfer the reference images from the HDD 221 to the memory 239 to store it in the memory 239 and read out the corresponding reference image to use it.

Next, a configuration of the large-volume stacker 110 of the image forming apparatus 101 will be described.

The large-volume stacker 110 includes a communication I/F 244, a CPU 245, a memory 246, and a discharge controller 247, which are connected via a bus 248. The communication I/F 244 is connected to the printing apparatus 107 via the communication cable 254 and performs communication necessary for control. The CPU 245 executes a control program stored in the memory 246 to perform various controls necessary for paper discharge. The memory 246 includes a ROM, a RAM, and the like and stores the control program and the like. The discharge controller 247 conveys papers to a stack tray, an escape tray, or the subsequent finisher 111 based on instructions from the CPU 245.

Next, a configuration of the finisher 111 of the image forming apparatus 101 will be described.

The finisher 111 includes a communication I/F 249, a CPU 250, a memory 251, a discharge controller 252, and a finishing processor 253, which are connected via a bus 255. The communication I/F 249 is connected to the printing apparatus 107 via the communication cable 254 and performs communication necessary for control. The CPU 250 executes a control program stored in the memory 251 to perform various controls necessary for finishing and paper discharge. The memory 251 includes a ROM, a RAM, and the like and stores the control program and the like. The discharge controller 252 controls paper conveyance and paper discharge based on instructions from the CPU 250. The finishing processor 253 performs finishing processing, such as stapling, punching, and saddle-stitch bookbinding, based on instructions from the CPU 250.

Although, in the above description, the external controller 102 and the image forming apparatus 101 are connected by the internal LAN 105 and the video cable 106, a configuration need only be capable of transmitting and receiving data necessary for printing; for example, a configuration of connection need only be a video cable. In addition, each of the memory 202, the memory 209, the memory 223, the memory 234, the memory 239, the memory 246, and the memory 251 need only be a storage apparatus for holding data and programs. For example, a configuration may be taken so as to replace them with a volatile RAM, a non-volatile ROM, an internal HDD, an external HDD, a USB memory, and the like.

Figure 3:
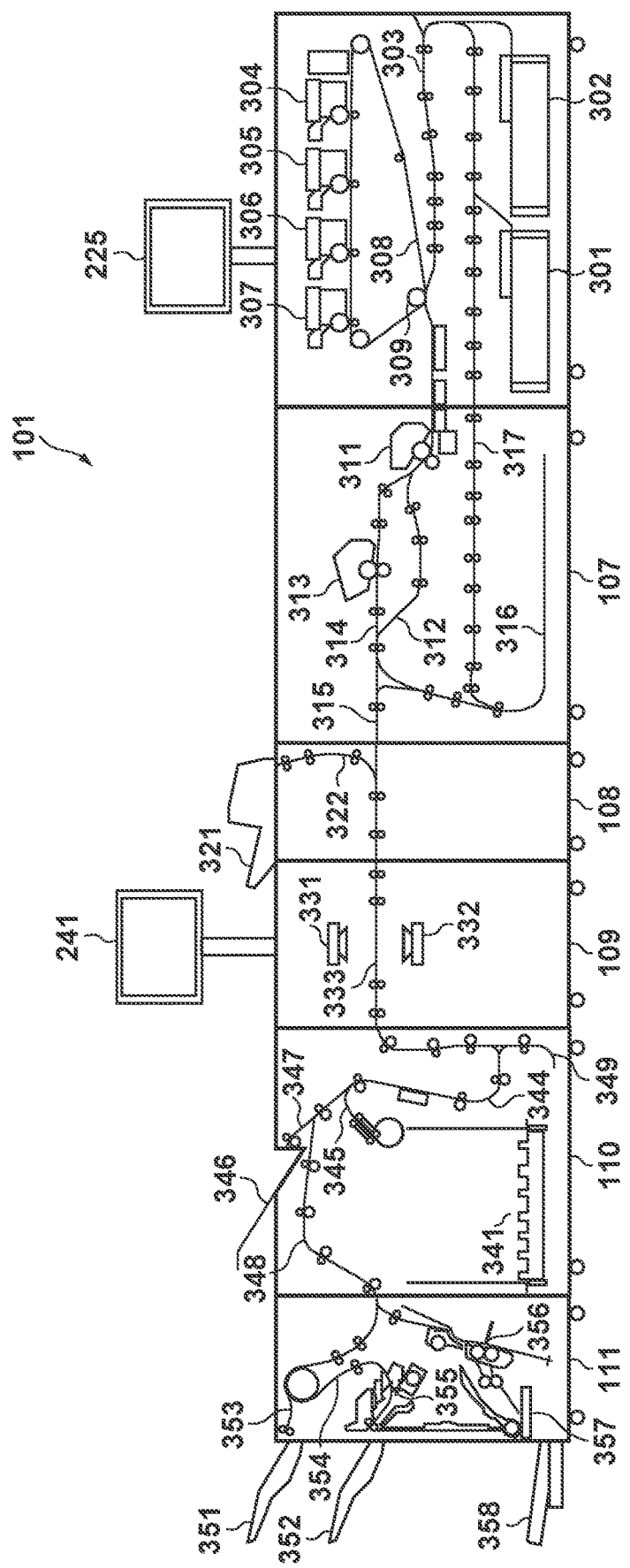
FIG. 3 depicts a schematic cross-sectional view illustrating a mechanism of the image forming apparatus according to the embodiment.

FIG. 3 depicts a schematic cross-sectional view illustrating a mechanism of the image forming apparatus 101 according to the embodiment.

First, the printing apparatus 107 will be described. Paper feed decks 301 and 302 can store a plurality of various types of paper. Each paper feed deck separates a single uppermost sheet of the stored papers and conveys it to a paper conveyance path 303. Information (a paper size and a paper type) of the stored papers can be set for each of the paper feed decks from the console unit 224 of the printing apparatus 107.

Developing stations 304 to 307 form toner images using colored toners of Y, M, C, and K, respectively, to form a color image. The toner images formed here are primary-transferred to an intermediate transfer belt 308 to form the color image. The intermediate transfer belt 308 is rotationally driven in a clockwise direction in FIG. 3, and the color image is transferred to a paper conveyed from the paper conveyance path 303 at a secondary transfer position 309 to form the color image on the paper. The display unit 225 displays information for a printing status and settings of the image forming apparatus 101. A fixing unit 311 fixes the color image on paper to the paper. The fixing unit 311 includes a pressure roller and a heating roller, and the color image is fixed to paper by melting and pressure bonding toner by passing the paper to which the color image has been transferred between rollers. Paper that has passed through the fixing unit 311 is conveyed to a conveyance path 315 through a paper conveyance path 312. Depending on the type of paper, if further melting and pressure bonding are necessary for fixing, the paper that has passed through the fixing unit 311 is conveyed to a second fixing unit 313 via an upper paper conveyance path. Then, the paper that has been subjected to additional melting and pressure bonding by the second fixing unit 313 is conveyed to the conveyance path 315 through a paper conveyance path 314. When an image forming mode is two-sided, paper after fixing is conveyed to a paper reversing path 316; after the front and back of the paper are reversed by the reversing unit 316, the paper is conveyed to a two-sided conveyance path 317; and an image is transferred to a second side of the paper at the secondary transfer position 309.

Next, a configuration of the inserter 108 for inserting paper will be described.

The inserter 108 includes an inserter tray 321 and causes a paper fed through a paper conveyance path 322 to join the conveyance path 315. This makes it possible to insert a paper at an arbitrary position into a group of a series of papers conveyed from the printing apparatus 107 and convey them to a subsequent apparatus.

Paper that has passed through the inserter 108 is conveyed to the inspection apparatus 109. In the inspection apparatus 109, cameras 331 and 332 are arranged in a form in which they are facing each other. The cameras 331 and 332 correspond to the aforementioned imaging unit 240. The camera 331 is a camera for reading an upper surface of paper, and the camera 332 is a camera for reading a bottom surface of paper. The inspection apparatus 109 reads an image of paper conveyed to a paper conveyance path 333 using the cameras 331 and 332 when the paper reaches a predetermined position and can determine whether or not an image printed on the paper is normal. The display unit 241 displays a result of inspection by the inspection apparatus 109 and the like.

Next, a configuration of the large-volume stacker 110 capable of stacking a large volume of paper will be described.

The large-volume stacker 110 includes a stack tray 341 as a tray for stacking papers. Paper that has passed through the inspection apparatus 109 is inputted to the large-volume stacker 110 through a paper conveyance path 344. The paper passes from the paper conveyance path 344 through a paper conveyance path 345 and is stacked onto the stack tray 341. The large-volume stacker 110 also includes an escape tray 346 as a paper discharge tray. The escape tray 346 is a paper discharge tray used for discharging paper determined to be abnormal paper by the inspection apparatus 109. When being discharged to the escape tray 346, paper is conveyed from the paper conveyance path 344 to the escape tray 346 via a paper conveyance path 347. When conveying paper to a post-processing apparatus downstream of the large-volume stacker 110, the paper is conveyed through a paper conveyance path 348. A reversing unit 349 is a mechanism for reversing the front and back of paper. The reversing unit 349 is used for when stacking paper onto the stack tray 341. When stacking papers onto the stack tray 341 such that an orientation of the paper at the time of input is the same as an orientation of the paper at the time of output, the paper is reversed once by the reversing unit 349. When conveying paper to the escape tray 346 or a subsequent post-processing apparatus (the finisher 111), the paper is discharged as is, without being flipped, when stacking; therefore a paper reversal operation is not performed by the reversing unit 349.

The finisher 111 may apply post-processing to conveyed papers according to functions specified by the user. Specifically, the finisher 111 includes a finishing function, such as stapling (1-position and 2-position stapling), punching (2-hole and 3-hole), and saddle-stitch bookbinding. The finisher 111 includes two paper discharge trays 351 and 352, and a paper bundle that is not subjected to finishing processing is outputted to the paper discharge tray 351 via a paper conveyance path 353. When performing finishing processing, such as stapling, fed papers are sent to a processing unit 355 via a paper conveyance path 354, a finishing function specified by the user is executed, and the papers are outputted to the paper discharge tray 352. The paper discharge trays 351 and 352 can each be moved up and down, and it is also possible to lower the paper discharge tray 351 and stack paper on which finishing processing has been performed by the processing unit 355 on the paper discharge tray 351. When saddle-stitch bookbinding is specified, a saddle-stitch processing unit 356 performs stapling processing at a center of a paper bundle, and then folds the paper bundle in two and outputs it to a saddle-stitch bookbinding tray 358 via a paper conveyance path 357. The saddle-stitch bookbinding tray 358 has a conveyor-belt configuration and is configured to convey a saddle-stitched bundle stacked on the saddle-stitch bookbinding tray 358 to a left side of FIG. 3.

Figure 4:
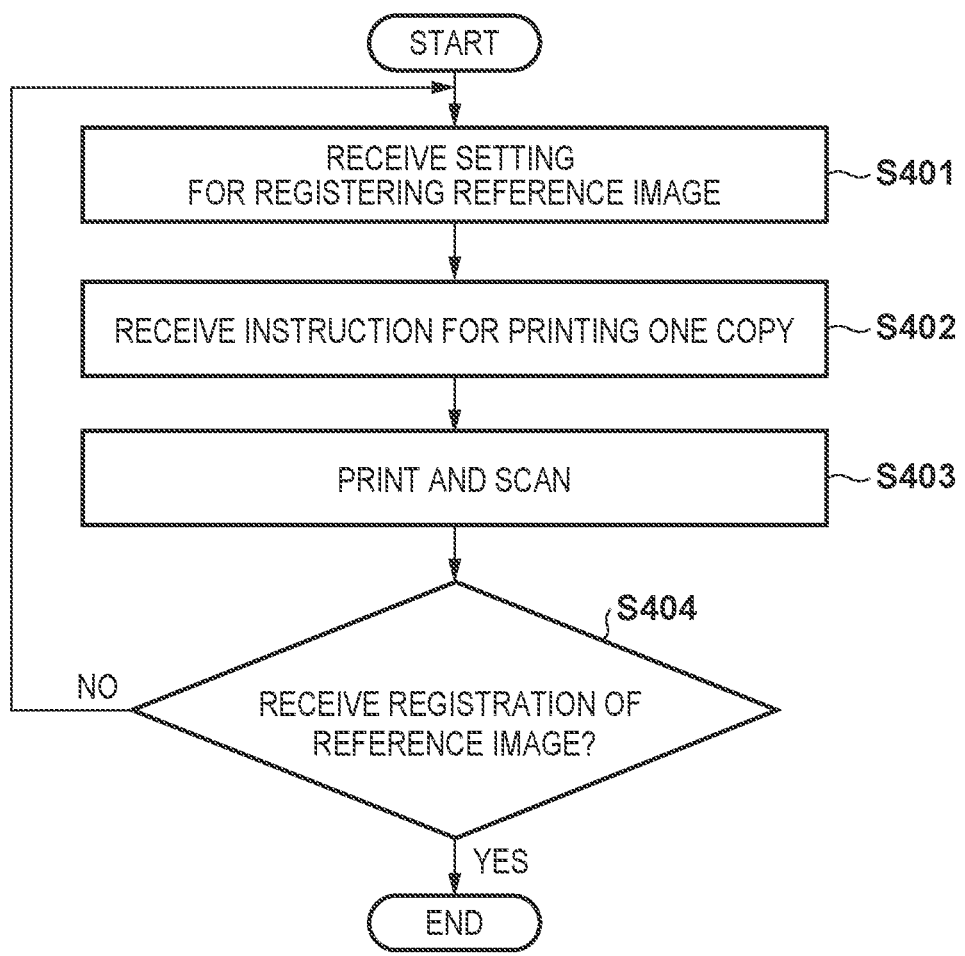
FIG. 4 is a flowchart for explaining processing for registering reference image data in a conventional inspection apparatus.

FIG. 4 is a flowchart for explaining processing for registering reference image data in a conventional inspection apparatus.

Here, reference image data is registered to inspect a printed product printed by an image forming apparatus. In this inspection, reference image data is registered in advance in an HDD of an inspection apparatus, and an image of paper is read using two cameras and compared with the reference image data to determine whether or not the image printed on the paper is normal. Conventionally, reference image data is registered by reading, using the cameras, paper on which printing has been performed obtained by actually performing printing and registering image data obtained by the reading as the reference image data.

In step S401, an inspection apparatus setting mode according to an operator is received from an operation unit. By this, the inspection apparatus enters a reference image data (reference image) registration mode. In a conventional registration mode, since scanner image data obtained by reading using the two cameras is used as reference image data, the inspection apparatus is in a standby state for waiting for paper to be conveyed to a paper conveyance path. In step S402, a print instruction is received from a PC. The print instruction received here is printing of one copy of a print job for which the operator wants to perform inspection. In step S403, the print job is executed, and reference images are respectively printed on papers based on image data. Furthermore, the papers on which printing has been performed are read by the cameras, and obtained scanned image data is stored in the HDD. At this time, the operator visually confirms whether the respective scanned image data is appropriate as the reference image by respectively confirming the papers on which printing has been performed and image previews that are displayed on a display unit. In step S404, when an instruction to register the scanned image data as the reference image is received, the processing ends. Meanwhile, when not registering the scanned image data as the reference image in step S404, the processing returns to step S401. At this time, based on the paper on which printing has been performed and the image preview displayed on the display unit, the operator cleans and/or adjusts the image forming apparatus, changes settings of the print job, and the like so that an appropriate image that can be registered as the reference image can be printed.

In such conventional registration of the reference image, since printing is actually performed and reference image data is inputted by the same input method as that of an image to be inspected, it is not necessary to consider a size, direction, and the like of the reference image and the image to be inspected, and inspection can be performed by simple image comparison. However, in a case of a print job with a large number of pages, an operator needs to visually determine whether or not printed images of all pages are appropriate as reference image data, which poses problems, such as there being a possibility of a confirmation error and confirmation needing a lot of time.

Figure 5:
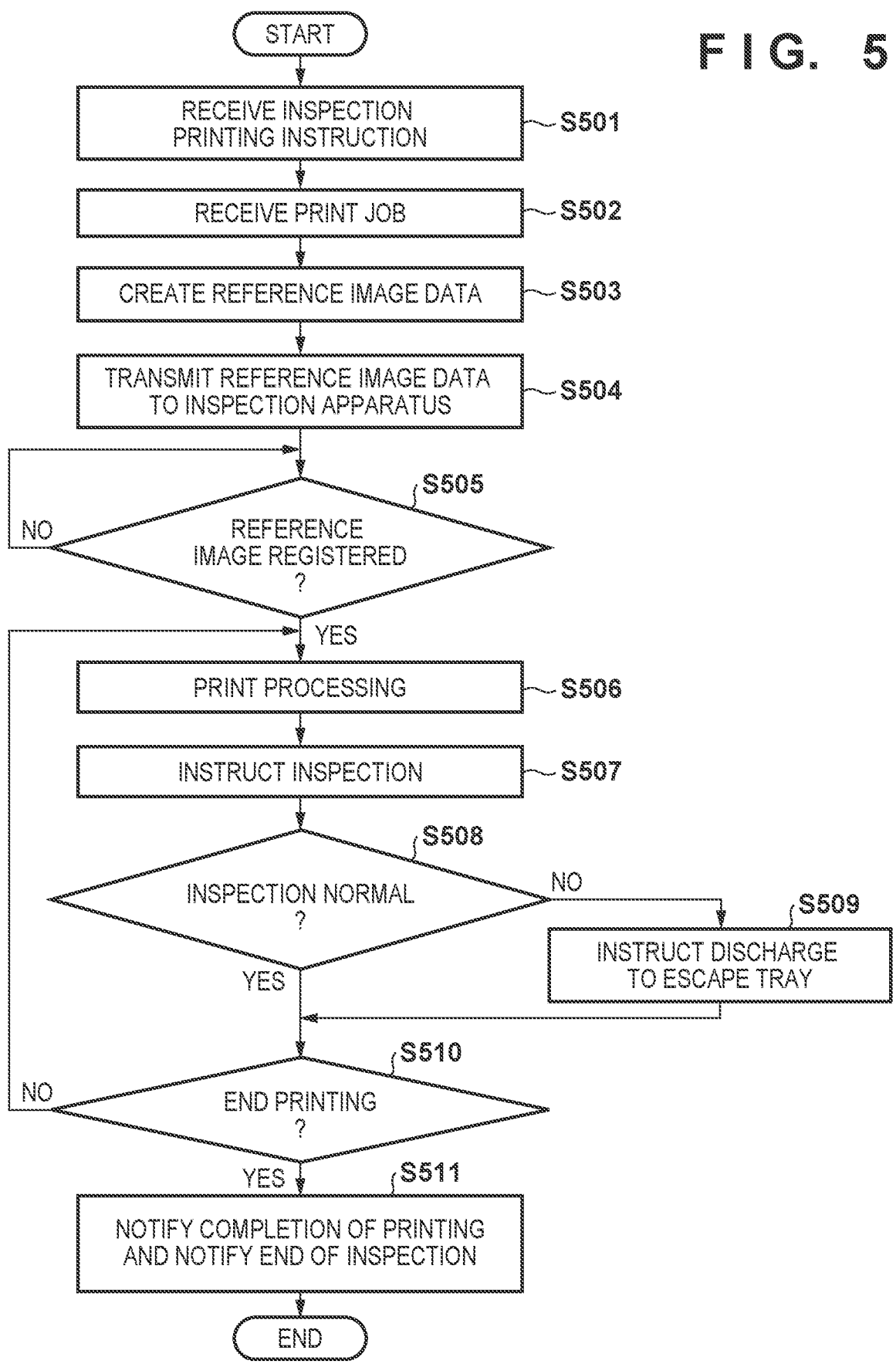
FIG. 5 is a flowchart for explaining processing by a printing apparatus of the image forming apparatus according to the embodiment.

FIG. 5 is a flowchart for explaining processing by the printing apparatus 107 of the image forming apparatus 101 according to the embodiment. The processing explained in this flowchart is achieved by the CPU 222 of the printing apparatus 107 executing a program deployed in the memory 223.

In the present embodiment, unlike FIG. 4 in which printing paper on which a reference image has been printed is read, a reference image is registered by rasterized image data (raster data) being registered as the reference image. In the embodiment, the printing apparatus 107 will be described using an example in which rasterized image data is received from the external controller 102 via the video cable 106, but the present invention is not limited to this. For example, the printing apparatus 107 may receive a print job (e.g., including PDL data) from the PC 103 and rasterize the print job.

In step S501, when an inspection printing instruction is received from the PC 103, the CPU 222 enters an inspection printing mode. Next, the processing proceeds to step S502, and the CPU 238 receives a print job transmitted from the PC 103 via the external controller 102. This print job includes at least print settings, including a paper size to be printed, resolution, image orientation, image size of each page, and the like, and image data. The print job received here is a print job including print data for which an operator wants to perform inspection. The above inspection printing instruction may be included in the print job received here. If so, step S501 can be omitted.

Next, the processing proceeds to step S503, and the CPU 222 creates print data (reference image data) by performing layout processing, which accords with that of the time of printing, on the image data included in the received print job. Then, the processing proceeds to step S504, and the CPU 222 transmits the created reference image data to the inspection apparatus 109 via the communication cable 254 and instructs the inspection apparatus 109 to register the created reference image data as a reference image. At this time, when the print job is a print job in which images that are different from each other are printed on a plurality of sheets (a plurality of pages) of paper, in step S503, the CPU 222 adds IDs (identification information, for example, page numbers) indicating respective pages to a plurality of items of reference image data, transmits the plurality of items of reference image data to the inspection apparatus 109, and thereby causes a plurality of different reference images to be registered together with their IDs. Thus the inspection apparatus 109 registers a plurality of items of reference image data in the memory 239 as a plurality of reference images.

Next, the processing proceeds to step S505, and the CPU 222 waits to receive from the inspection apparatus 109 a notification that reference image data has been registered as the reference image, and when the notification is received, the processing proceeds to step S506, and the CPU 222 executes printing processing according to the received print job. When printing on a sheet of paper is completed in this way, the processing proceeds to step S507, and the CPU 222 discharges the paper on which printing has been performed and feeds it to the inspection apparatus 109 as well as gives an inspection instruction to the inspection apparatus 109. At this time, if the print job is a print job of a plurality of sheets (a plurality of pages) of paper, in step S507, the CPU 222 gives an inspection instruction together with page numbers (IDs) of papers on which printing has been performed.

Next, the processing proceeds to step S508, and the CPU 222 waits to receive an inspection result from the inspection apparatus 109 and determines whether the result is OK (normal) or NG (abnormal). If the inspection result is OK, the processing proceeds to step S510, and if it is not OK, the processing proceeds to step S509, and the CPU 222 instructs the large-volume stacker 110 to discharge the paper to the escape tray 346 and the processing proceeds to step S510. In step S510, the CPU 222 determines whether or not printing processing based on the print job has ended, and if it is determined that the printing processing has ended, the processing proceeds to step S511, and if it is determined that the printing processing has not ended, the processing proceeds to step S506. In step S511, the CPU 222 notifies the external controller 102 that printing has been completed. At this time, the CPU 222 also notifies the inspection apparatus 109 of an end of inspection processing.

By this processing, simply by transmitting to a printing apparatus a print job for which they want to perform inspection printing, the user can execute the print job while printed products printed according to the print job are inspected.

An instruction for performing a discharge to the escape tray 346 in step S509 may be performed by the inspection apparatus 109.

Figure 6:
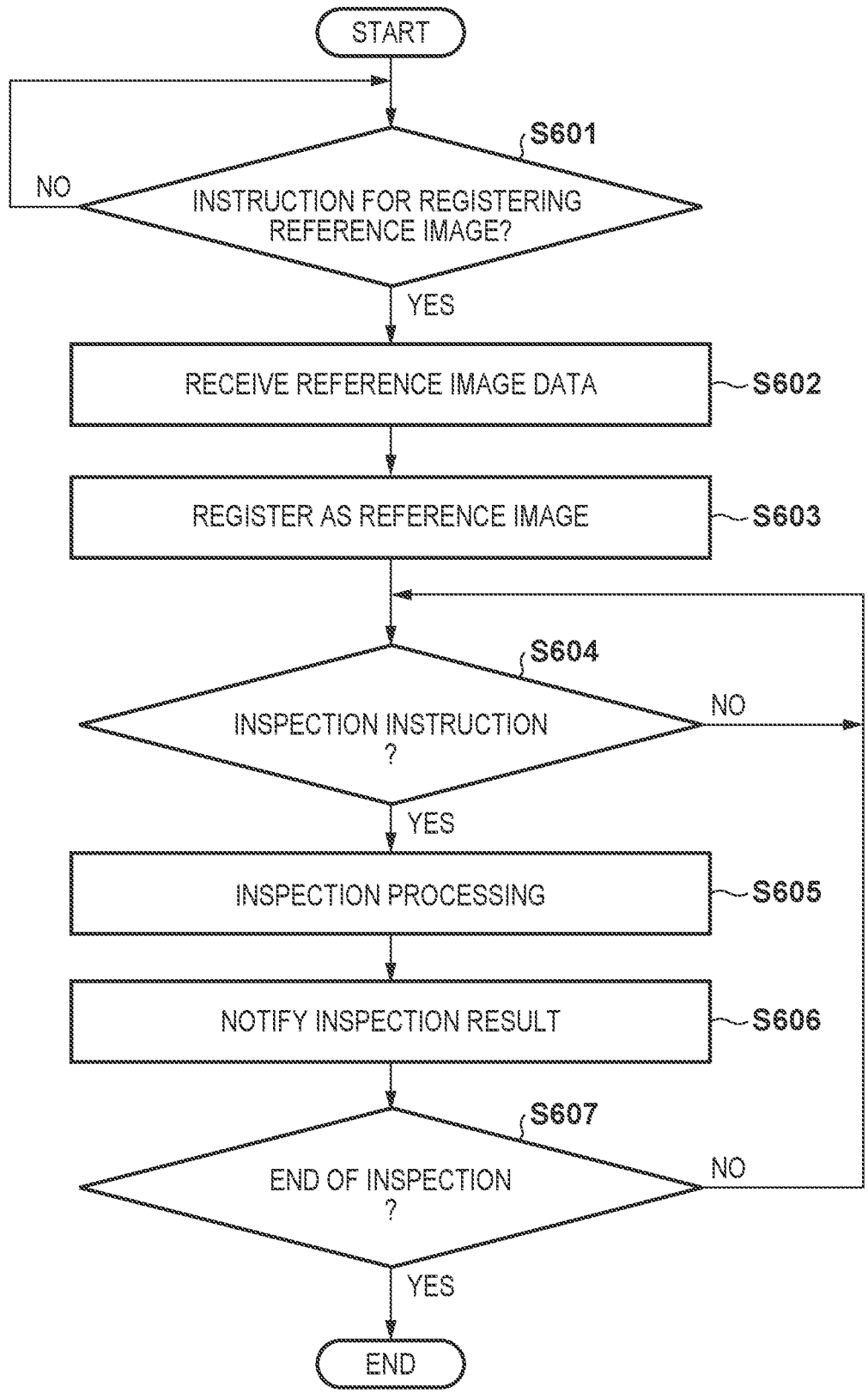
FIG. 6 is a flowchart for explaining processing by an inspection apparatus according to the embodiment.

FIG. 6 is a flowchart for explaining processing by the inspection apparatus 109 according to the embodiment. The processing explained in this flowchart is achieved by the CPU 238 of the inspection apparatus 109 executing a program deployed in the memory 239.

First, in step S601, the CPU 238 waits to receive from the printing apparatus 107 an instruction for registering reference image data (a reference image). When the registration instruction is received, the processing proceeds to step S602, and the CPU 238 sets the inspection apparatus 109 to a reference image registration mode and receives reference image data sent from the printing apparatus 107. A configuration may be taken so as to set the inspection apparatus 109 to the reference image registration mode, for example, by an operator via the operation unit 242 of the inspection apparatus 109.

Next, the processing proceeds to step S603, and the CPU 238 registers the received reference image data as a reference image. Next, the processing proceeds to step S604, and the CPU 238 waits for an inspection instruction to be inputted from the printing apparatus 107, and when the inspection instruction is inputted, the processing proceeds to step S605. In step S605, the CPU 238 reads, using the cameras 331 and 332, paper to be inspected, on which printing has been performed by the printing apparatus 107 and that has been conveyed, and stores, in the HDD 272, scanned image data obtained by the reading. Then, the scanned image data of the paper to be inspected is inspected by being compared with the reference image registered in step S603. Then, in step S606, the CPU 238 notifies the printing apparatus 107 of an inspection result and the processing proceeds to step S607. In step S607, the CPU 238 determines whether a notification that inspection processing has ended has come from the printing apparatus 107, and if the end notification has not come, the processing proceeds to step S604. Meanwhile, when the end notification has come, the processing ends.

At this time, when the print job is a print job in which images that are different from each other are printed on a plurality of sheets (a plurality of pages) of paper, in step S603, the inspection apparatus 109 registers a plurality of different reference images together with the aforementioned IDs (identification information). Then, in step S605, inspection is performed based on an ID, such as a page number of paper, for example, included in the inspection instruction from the printing apparatus 107 by obtaining from a plurality of registered reference images a reference image corresponding to the ID.

In addition, when registering a plurality of reference images and performing inspection, if an order in which the plurality of reference images are registered and an order of images to be printed and inspected are the same, the reference images and scanned image data of printed images need only be compared in order, so the aforementioned IDs need not be used.

Figure 7:
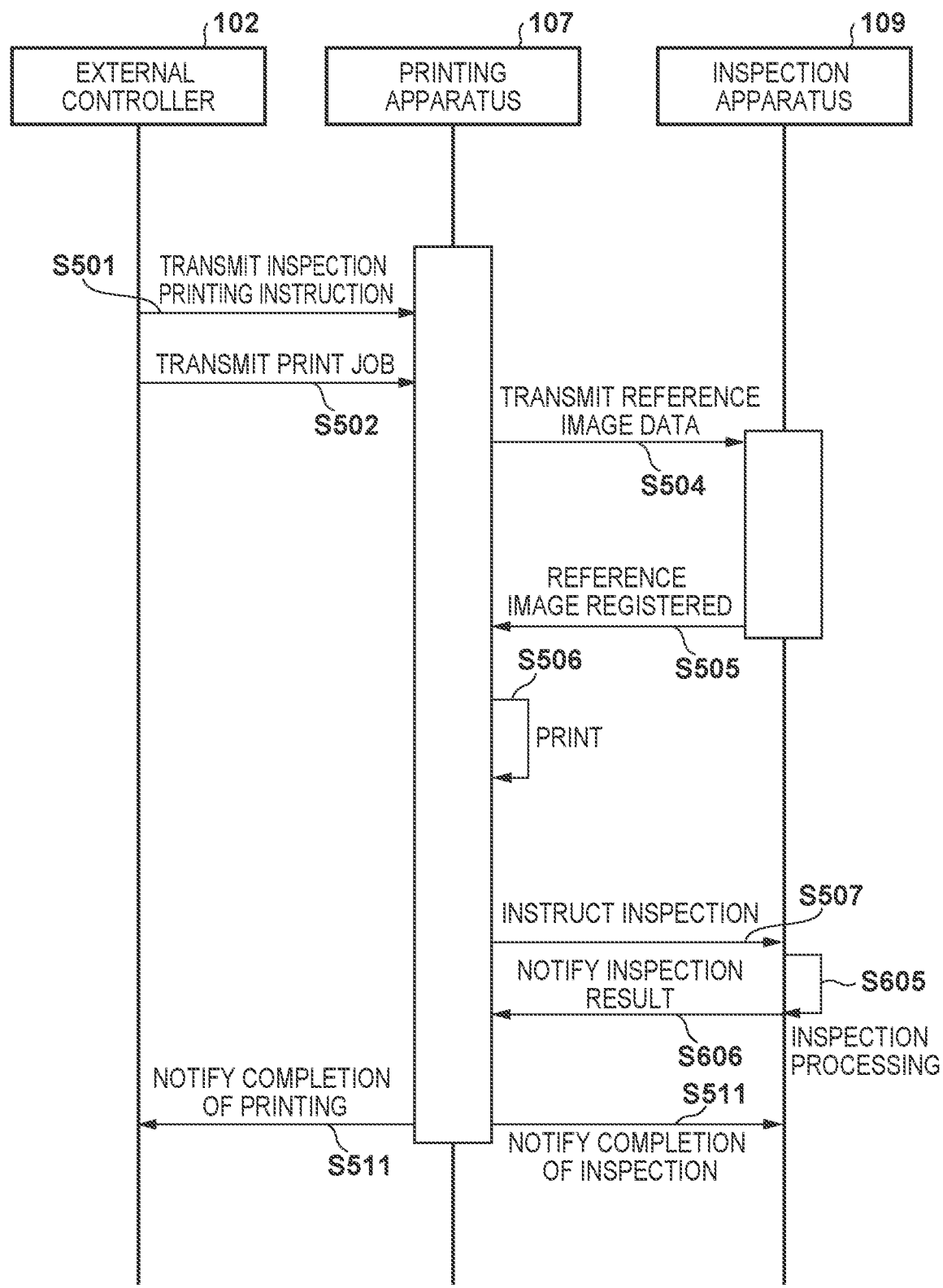
FIG. 7 is a sequence diagram for explaining processing by the external controller, the printing apparatus, and the inspection apparatus according to the embodiment.

FIG. 7 is a sequence diagram for explaining processing by the external controller 102, the printing apparatus 107, and the inspection apparatus 109 according to the embodiment. Reference numbers of processing steps indicated in FIG. 7 correspond to numbers of processing steps of the aforementioned FIGS. 5 and 6.

In step S501, the external controller 102 notifies the printing apparatus 107 of an inspection printing instruction. Thereafter, the printing apparatus 107 executes a received print job while inspecting it. Next, in step S502, the external controller 102 transmits the print job to the printing apparatus 107. By this, in step S504, the printing apparatus 107 creates reference image data from the print job, transmits it to the inspection apparatus 109, and registers it as a reference image. When the reference image has been registered, in step S505, the inspection apparatus 109 notifies the printing apparatus 107 that registration has been completed.

By this, in step S506, the printing apparatus 107 executes printing processing based on the print job received from the external controller 102. In step S506, the print job received in step S501 from the external controller 102 may be received again, and print processing may be executed based on the received print job. Then, paper on which printing has been performed is conveyed to the inspection apparatus 109, and in step S507, an inspection instruction is given to the inspection apparatus 109. By this, the inspection apparatus 109, in step S605, executes inspection processing on the conveyed paper on which printing has been performed and, in step S606, notifies the printing apparatus 107 of a result of the inspection. Upon receiving this notification, if that inspection result is OK, the printing apparatus 107 controls so as to convey the paper on which printing has been performed to a subsequent apparatus. Meanwhile, if the inspection result is NG, the printing apparatus 107 controls so as to discharge the paper whose inspection result is NG to the escape tray 346 of the large-volume stacker 110. When printing is thus completed, in step S511, the printing apparatus 107 notifies the external controller 102 that printing has been completed. At the same time, the printing apparatus 107 also notifies the inspection apparatus 109 of an end of inspection.

OTHER EMBODIMENTS

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2021-156081, filed Sep. 24, 2021, which is hereby incorporated by reference herein in its entirety.

What is claimed is:

1. A print system including a printing apparatus and an inspection apparatus,
the printing apparatus comprising:
a printer engine; and
a first controller including one or more first processors and one or more first memories, the first controller being configured to:
obtain, from a print job, image data to be used for printing;
generate a reference image based on the image data;
transmit the generated reference image to the inspection apparatus;
receive, from the inspection apparatus, a notification that registration of the reference image has been completed;
based on the notification, control the printer engine in accordance with the print job so as to cause the printer engine to start printing of image data to be inspected on a sheet; and
notify the inspection apparatus of an instruction for inspecting the sheet on which printing has been performed by the printer engine,
the inspection apparatus comprising:
a second controller including one or more second processors and one or more second memories, the second controller being configured to:
register the reference image received from the printing apparatus;
transmit the notification to the printing apparatus; and
based on the instruction for inspecting, inspect the sheet on which the printing has been performed in the printing apparatus.

2. The print system according to claim 1, wherein when obtaining the image data, the first controller obtains the image data to be used for printing by rasterizing print data included in the print job and performing, on the rasterized image data, layout processing that accords with layout processing at a time of printing.

3. The print system according to claim 1, wherein when generating the reference image, in a case where the print job includes a plurality of items of image data, the first controller generates reference images corresponding to the plurality of items of image data together with identification information corresponding to each of the plurality of items of image data.

4. The print system according to claim 3, wherein in a case where the print job includes the plurality of items of image data, the first controller notifies the inspection apparatus of the instruction for inspecting sheets on which printing has been performed by the printer engine together with the identification information.

5. The print system according to claim 1, wherein the first controller conveys to the inspection apparatus a sheet on which printing has been performed, and the second controller inspects the sheet conveyed from the printing apparatus.

6. The print system according to claim 1, further comprising:
a stacker configured to receive and store sheets on which printing has been performed in the printing apparatus, wherein the stacker discharges, to a paper discharge tray that is different from a paper discharge tray to which sheet determined to be normal is discharged, sheet determined to be abnormal in inspection processing by the inspection apparatus.

7. The print system according to claim 1, wherein the print job includes the instruction for inspecting.

8. A printing apparatus comprising:
a printer engine; and
a controller including one or more processors and one or more memories, the controller being configured to:
obtain, from a print job, image data to be used for printing;
generate a reference image based on the image data;
transmit the generated reference image to the inspection apparatus;
receive, from the inspection apparatus, a notification that registration of the reference image has been completed;
based on the notification, control the printer engine in accordance with the print job so as to cause the printer engine to start printing of image data to be inspected on a sheet; and notify the inspection apparatus of an instruction for inspecting the sheet on which printing has been performed by the printer engine.

9. The printing apparatus according to claim 8, wherein when obtaining the image data, the controller obtains the image data to be used for printing by rasterizing print data included in the print job and performing, on the rasterized image data, layout processing that accords with layout processing at a time of printing.

10. The printing apparatus according to claim 8, wherein when generating the reference image, in a case where the print job includes a plurality of items of image data, the controller generates reference images corresponding to the plurality of items of image data together with identification information corresponding to each of the plurality of items of image data.

11. The printing apparatus according to claim 8, wherein in a case where the print job includes the plurality of items of image data, the controller notifies the inspection apparatus of the instruction for inspecting sheets on which printing has been performed by the printer engine together with identification information corresponding to each of the plurality of items of image data.

12. The printing apparatus according to claim 8, wherein the controller conveys a sheet on which printing has been performed to the inspection apparatus, and the inspection apparatus inspects the sheet conveyed from the printing apparatus.

13. The printing apparatus according to claim 8, wherein the print job includes the instruction for inspecting.

14. A method of controlling a print system including a printing apparatus and an inspection apparatus, the method comprising:
obtaining, by the printing apparatus and from a print job, image data to be used for printing;
generating, by the printing apparatus, a reference image based on the image data;
transmitting, by the printing apparatus, the generated reference image to the inspection apparatus;
receiving, from the inspection apparatus and by the printing apparatus, a notification that registration of the reference image has been completed;
based on the notification, starting, by the printing apparatus, printing of image data to be inspected in accordance with the print job;
notifying, by the printing apparatus, the inspection apparatus of an instruction for inspecting a sheet on which the printing has been performed;
registering, by the inspection apparatus, the reference image transmitted from the printing apparatus;
transmitting, by the inspection apparatus, the notification to the printing apparatus; and
based on the instruction for inspecting, inspecting, by the inspection apparatus, the sheet on which printing has been performed in the printing apparatus.

15. The method according to claim 14, wherein when generating the reference image, in a case where the print job includes a plurality of items of image data, the printing apparatus generates reference images corresponding to the plurality of items of image data together with identification information corresponding to each of the plurality of items of image data.

16. The method according to claim 14, wherein in a case where the print job includes a plurality of items of image data, the printing apparatus notifies the inspection apparatus of the instruction for inspecting sheets on which printing has been performed by a printer engine together with the identification information corresponding to each of the plurality of items of image data.

17. A method of controlling a printing apparatus, the method comprising:
obtaining, from a print job, image data to be used for printing;
generating a reference image based on the image data;
transmitting the generated reference image to an inspection apparatus;
receiving, from the inspection apparatus, a notification that registration of the reference image has been completed;
based on the notification, starting printing of image data to be inspected in accordance with the print job; and
notifying the inspection apparatus of an instruction for inspecting a sheet on which printing has been performed.

18. The method according to claim 17, wherein when generating the reference image, in a case where the print job includes a plurality of items of image data, the printing apparatus generates reference images corresponding to the plurality of items of image data together with identification information corresponding to each of the plurality of items of image data.

19. A printing apparatus comprising:
a printer engine; and
a controller including one or more processors and one or more memories, the controller being configured to:
generate a reference image based on a print job;
transmit the generated reference image to an inspection apparatus;
receive, from the inspection apparatus, a notification that registration of the reference image has been completed; and
based on the notification, control the printer engine in accordance with the print job so as to cause the printer engine to start printing of image data to be inspected on a sheet.

* * * * *